US012754885B2

(12) United States Patent
Ghazal et al.

(10) Patent No.: US 12,754,885 B2
(45) Date of Patent: Oct. 6, 2026

(54) SYSTEMS AND METHODS FOR DEPTH BASED CACHE AUTHORITATIVENESS

(71) Applicant: RELATIVITY ODA LLC, Chicago, IL (US)

(72) Inventors: Mohammad Amer Ghazal, Chicago, IL (US); Ankit Khandelwal, Chicago, IL (US); Steven Engelhardt, Chicago, IL (US)

(73) Assignee: RELATIVITY ODA LLC, Chicago, IL (US)

( * ) Notice: Subject to any disclaimer, the term of this patent is extended or adjusted under 35 U.S.C. 154(b) by 0 days.

(21) Appl. No.: 18/655,652

(22) Filed: May 6, 2024

(65) Prior Publication Data

US 2025/0217328 A1 Jul. 3, 2025

Related U.S. Application Data

(60) Provisional application No. 63/616,179, filed on Dec. 29, 2023.

(51) Int. Cl.

| | |
|---|---|
| ***G06F 17/00*** | (2019.01) |
| ***G06F 7/00*** | (2006.01) |
| ***G06F 16/172*** | (2019.01) |
| ***G06F 16/18*** | (2019.01) |
| ***G06F 16/185*** | (2019.01) |

(52) U.S. Cl.
CPC .......... *G06F 16/185* (2019.01); *G06F 16/172* (2019.01); *G06F 16/1873* (2019.01)

(58) Field of Classification Search
CPC ... G06F 16/185; G06F 16/1873; G06F 16/172
USPC .......................................................... 707/822
See application file for complete search history.

(56) References Cited

U.S. PATENT DOCUMENTS

| | | | | |
|---|---|---|---|---|
| 8,447,733 | B2 * | 5/2013 | Sudhakar ............ | G06F 16/1873 707/638 |
| 8,706,701 | B1 * | 4/2014 | Stefanov ................. | G06F 16/13 713/160 |
| 11,483,415 | B2 * | 10/2022 | Yellin ................. | H04L 67/5681 |
| 2002/0065932 | A1 * | 5/2002 | Kobayashi .......... | H04L 67/5682 709/233 |
| 2002/0138607 | A1 * | 9/2002 | O'Rourke ............. | G06F 16/283 709/224 |
| 2005/0197887 | A1 * | 9/2005 | Zuerl ................. | G06Q 30/0206 705/7.29 |

(Continued)

*Primary Examiner* — Pavan Mamillapalli
(74) *Attorney, Agent, or Firm* — MARSHALL, GERSTEIN & BORUN LLP

(57) ABSTRACT

Techniques for depth-based cache authoritativeness are provided. A method includes receiving a request for an object maintained at long-term storage (LTS) system and associated with a hierarchical directory; retrieving the object from the LTS system; storing the object in the cache such that the object is associated with metadata indicating (i) a storage time at which the storage occurred and (ii) whether the object is authoritative; detecting a stimulus to determine whether the object is authoritative; responsive to detecting the stimulus, determining whether the object is authoritative; and responsive to determining that the object in the cache is non-authoritative, setting the metadata indicating whether the object is authoritative to indicate that the object is not authoritative.

17 Claims, 4 Drawing Sheets

400

(56) References Cited

U.S. PATENT DOCUMENTS

| | | | | |
|---|---|---|---|---|
| 2005/0197901 | A1* | 9/2005 | Veit .................... | G06Q 30/0242<br>705/14.41 |
| 2007/0198504 | A1* | 8/2007 | Feng ..................... | G06F 16/951<br>707/999.005 |
| 2012/0005440 | A1* | 1/2012 | Nakao ................... | G06F 3/0607<br>711/E12.002 |
| 2014/0082145 | A1* | 3/2014 | Lacapra ................ | H04L 69/164<br>709/219 |
| 2018/0176663 | A1* | 6/2018 | Damaggio .......... | H04L 41/0816 |
| 2021/0073237 | A1* | 3/2021 | Wang ................ | G06F 16/24578 |
| 2021/0329091 | A1* | 10/2021 | Yellin ................. | H04L 67/5681 |
| 2022/0035741 | A1* | 2/2022 | Ray ..................... | G06F 12/0813 |
| 2022/0150320 | A1* | 5/2022 | Friedrich .............. | H04L 67/568 |
| 2022/0343034 | A1* | 10/2022 | Del Giudice ......... | G06F 21/575 |

* cited by examiner

SYSTEMS AND METHODS FOR DEPTH BASED CACHE AUTHORITATIVENESS

CROSS-REFERENCE TO RELATED APPLICATIONS

This application claims priority to and the filing date of provisional U.S. Patent Application No. 63/616,179 entitled "SYSTEMS AND METHODS FOR DEPTH-BASED CACHE AUTHORITATIVENESS," filed on Dec. 29, 2023, the entire contents of which is hereby expressly incorporated herein by reference.

FIELD OF THE DISCLOSURE

The present disclosure is directed to cache management, and more particularly to depth-based determination of cache authoritativeness.

BACKGROUND

When providing software services to customers, the customer data is typically maintained at a long-term storage (LTS) system. This enables the service provider to readily scale the amount of storage provided based upon customer demand. However, interfacing with data stored in the LTS system is typically slower than if the customer data was maintained in an on-premises solution due to the need to interface with an external storage system. As a result, when the software service needs to interact with the customer data, the software service typically interacts with a copy of the customer data maintained at a local cache. Because this cache is local to the software service, the software service is able to execute tasks that interact with the customer data in a quicker manner.

Within a customer workspace, events related to objects, such as directories, within the cache may share an event bus utilized by other workspace applications. As a result, the local cache may process cache-related events significantly slower than the LTS system. Accordingly, due to differences in event processing time, the local version of the object may be inconsistent with the version maintained at the LTS system. Said another way, the local version of the object in the cache may no longer be the authoritative version of the object.

In view of the foregoing challenges, there is a need for systems and methods of depth-based determination of cache authoritativeness.

BRIEF SUMMARY

The following relates to depth-based determination of cache authoritativeness. A service provider may provide a customer workspace to interact with data maintained at a remote, cloud-based LTS system. Applications running in the workspace generate requests to interact with an object maintained at the LTS system. If the object is not a cache local to the workspace, a cache manager may fetch the object from the LTS for storage in the cache. When the cache manager stores the object in the local cache, the cache manager may assign the object a configurable time to live period (also referred to herein as a "cache freshness interval") indicative of a duration the cached object may be considered authoritative. A cache manager (or other application running in the workspace) may monitor objects to determine whether the time to live has expired. After the determination that the time to live has expired, the cached object may be refreshed with a version of the object obtained from the LTS system.

As one approach, the workspace runs a crawler application to constantly monitoring objects in the cache to determine their authoritativeness. This may reduce the time lag between an object not complying with an authoritativeness rule and the object metadata being updated to indicate the same. As another approach, the workspace waits until detecting a request for the object before determining the object authoritativeness. This may avoid cache crawls and unnecessary input/output activity associated with refreshing cached objects that are never accessed.

Cached objects may be associated with a hierarchical file system. In some embodiments, the objects are stored in an object-based storage system (either locally at the cache or at the LTS system) and the file system represent an abstraction layer on top of the object-based storage system that mimics the organization structure of file-based storage systems. As it is used herein, the depth of an object refers to the number of tiers in the hierarchical file system between the object and a root tier.

Each level of depth within the hierarchy may be associated with a respective cache freshness interval corresponding to the duration that the object remains authoritative after storage in the cache. In some aspects, objects at a greater folder depth may generally be accessed and/or modified more frequently than objects at a lower folder depth. As such, the object is more likely to be changed, and thus, have greater potential to have inconsistencies between the local cache and the LTS system. Accordingly, objects at higher depths may be associated with a shorter cache freshness interval.

In one embodiment, a computer-implemented method for determining authoritativeness of a folder in a cache may be provided. The method may include: (1) receiving a request for an object maintained at long-term storage (LTS) system and associated with a hierarchical directory; (2) retrieving the object from the LTS system; (3) storing the object in the cache such that the object is associated with metadata indicating (i) a storage time at which the storage occurred and (ii) whether the object is authoritative; (4) detecting a stimulus to determine whether the object is authoritative; (5) responsive to detecting the stimulus, determining whether the object is authoritative by comparing the cache storage time to a cache freshness interval, wherein the cache freshness interval is derived based upon a depth of the object in the hierarchical directory; and (6) responsive to determining that the folder object in the cache is non-authoritative, setting the metadata indicating whether the object is authoritative to indicate that the object is not authoritative.

In another embodiment, a system for determining authoritativeness of an object in a cache may be provided. The system may include (i) one or more processors and (ii) one or more non-transitory memories storing instructions. The instructions, when executed by the one or more processors, cause the system to: (1) receive a request for an object maintained at long-term storage (LTS) system and associated with a hierarchical directory; (2) retrieve the object from the LTS system; (3) store the object in the cache such that the object is associated with metadata indicating (i) a storage time at which the storage occurred and (ii) whether the object is authoritative; (4) detect a stimulus to determine whether the object is authoritative; (5) responsive to detecting the stimulus, determine whether the object is authoritative by comparing the cache storage time to a cache freshness interval, wherein the cache freshness interval is derived based upon a depth of the object in the hierarchical directory; and (6) responsive to determining that the object in the cache is non-authoritative, set the metadata indicating whether the object is authoritative to indicate that the object is not authoritative.

In yet another embodiment, one or more non-transitory computer readable media storing processor-executable instructions may be provided. The instructions, when executed by one or more processors, cause the one or more processors to (1) receive a request for an object maintained at long-term storage (LTS) system and associated with a hierarchical directory; (2) retrieve the object from the LTS system; (3) store the object in a cache such that the object is associated with metadata indicating (i) a storage time at which the storage occurred and (ii) whether the object is authoritative; (4) detect a stimulus to determine whether the object is authoritative; (5) responsive to detecting the stimulus, determine whether the object is authoritative by comparing the cache storage time to a cache freshness interval, wherein the cache freshness interval is derived based upon a depth of the object in the hierarchical directory; and (6) responsive to determining that the object in the cache is non-authoritative, set the metadata indicating whether the object is authoritative to indicate that the object is not authoritative.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Additional, alternate and/or fewer actions, steps, features and/or functionality may be included in an aspect and/or embodiments, including those described elsewhere herein. Accordingly, the drawings and description are to be regarded as illustrative in nature and not as restrictive.

DETAILED DESCRIPTION

1. Overview

The present techniques relate to depth-based determinations of authoritativeness of a cached folder. As it is generally used herein, an "object" refers to any type of data that can be represented by a software object (e.g., a directory, a document file, a document fragment, a metadata file, an unstructured data file, and/or other data types). In some cases, the "object" is a "document." For example, a document may be a Microsoft Word file, a text file, an email, a pdf, a presentation, a spreadsheet, an image, a messaging file format, an audio file, and/or other documents. The term "document" may refer to either the document file (e.g., a .doc or .txt file) or a corresponding object(s) from which the document (or a portion thereof) can be derived. In other cases, the "object" is a directory that includes a plurality of directory entries, e.g., files.

Generally, there are two main operations performed by software systems with respect to objects maintained at the cloud storage system—(1) read operations where an object is obtained from the cloud storage system, and (2) write operations where new objects are written to the cloud storage system or changes to existing objects at the cloud storage system are propagated to the copy maintained thereat. For read operations, the objects obtained from cloud storage system are stored in a local cache where applications supported by the software system can quickly interface with the object. For example, the objects read into the cache may be presented for display by a user interface application, processed by a data processing application, such as an OCR processing application or a PDF converter, or other operations supported by the software system.

For write operations, the cache may also serve as a staging area where objects (and/or changes thereto) are stored until they have been successfully written to the cloud storage system. As one example, an object collection application may detect that a user uploaded a set of objects to a workspace. Accordingly, the cache may be configured to store the collected objects while they are being written to the cloud storage system. As another example particular to an object review process, a reviewer may have made one or more coding decisions with respect to an assigned batch of objects. Accordingly, the copies of the objects read into the cache are updated to reflect the coding decisions of the reviewer. Thus, the cache may store the updated copies of the objects that are to be written back to the cloud storage system.

II. Example Computing Environment

Figure 1:
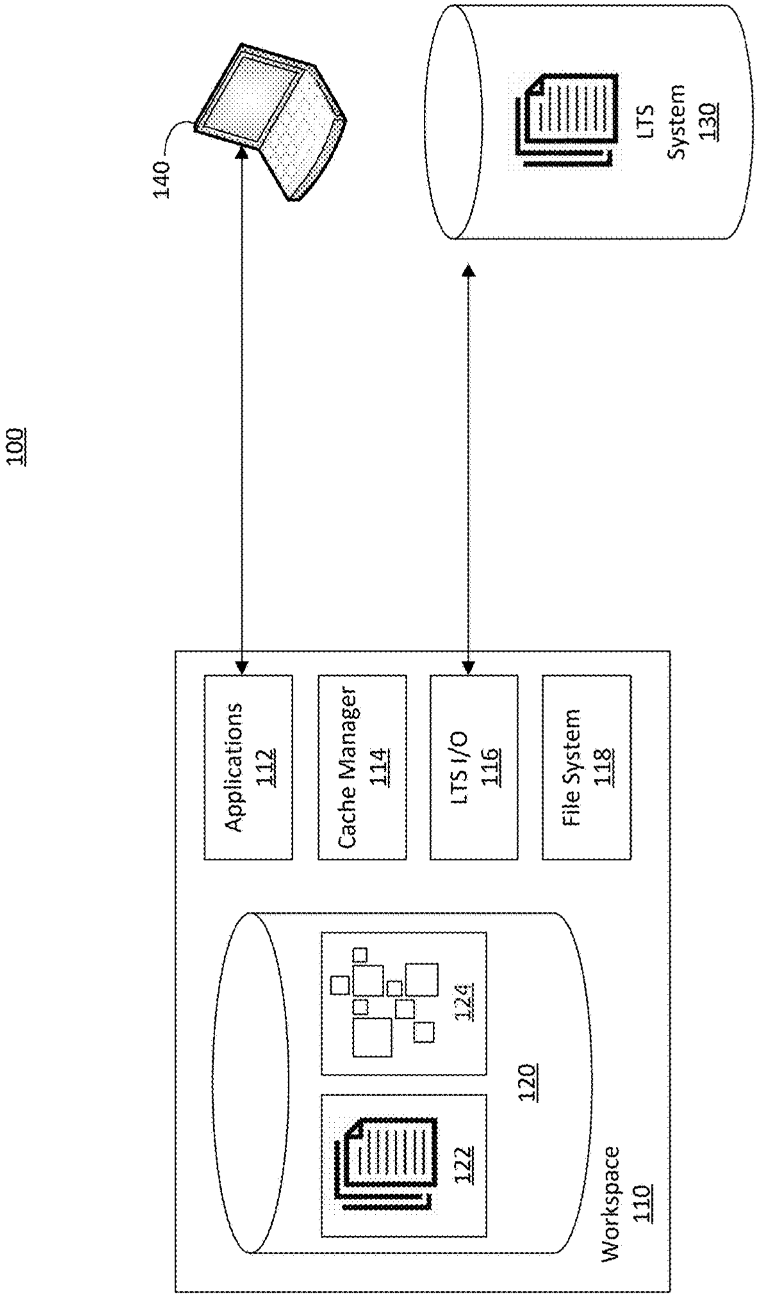
FIG. 1 illustrates an example environment that may be used to implement the techniques for determining authoritativeness of an object in a cache, according to an embodiment.

FIG. 1 depicts an example data storage environment 100 that may be used to implement the disclosed depth-based cache authoritativeness determination techniques. As illustrated, the environment 100 includes one or more workspaces 110, long-term storage (LTS) systems 130, and client devices 140.

A workspace 110 may include a plurality of software modules that implement the disclosed techniques. Generally, the workspace 110 is client- and/or user-specific software environment that enables users to interface with their data maintained within the workspace. In some embodiments, the workspace 110 may be hosted on one or more virtual machines instantiated in a cloud computing environment or an on-premises deployment of servers. Accordingly, the modules of the workspace 110 may be instantiated across any number of different physical computing units that include respective sets of one or more processors (e.g., one or more microprocessors, one or more CPUs, one or more GPUs, etc.).

More specifically, the software modules that are included in the workspace 110 may be instantiated by one or more processors configured to execute software instructions stored in one or more memories of the physical memory (e.g., stored in a persistent memory such as a hard drive or solid-state memory). It should be appreciated that certain instructions may be more efficiently executed by different types of processors. Accordingly, the processors that instantiate the various components of the workspace 110 may be configured to execute different instructions using the different processor types. In some embodiments, the workspace 110 may include multiple instantiated copies of any of the components therein to perform the disclosed functionality in parallel with one another.

As illustrated, the workspace 110 includes a cache 120. The cache 120 may implement any storage type, including ephemeral storage, permanent storage, and/or combinations thereof. The cache 120 may include separate storage for the objects and the metadata. In the illustrated example, the cache 120 includes an object storage 122 and a metadata storage 124. The object storage 122 may comprise a subset of the objects maintained at the LTS system 130. The cache metadata storage 124 may be a separate data store for storing metadata regarding the objects in the object storage 122. In some aspects, the metadata in the metadata storage 124 may include an object identifier associated with the object to which the metadata corresponds and/or storage times of folders. It should be appreciated that while FIG. 1 depicts the object storage 122 and the metadata storage 124 as part of the cache 120, in other embodiments, the object storage 122 and the metadata storage 124 are maintained at separate data stores.

As illustrated, the workspace 110 includes a file system 118 that maintains directories of all objects. These directories may define a hierarchical folder structure at which the objects may be stored within a file system structure. In some embodiments, the file system 118 processes commands configured in accordance with a protocol for interacting with a conventional file-based storage. However, instead of executing the commands to interact with a physical file-based storage, the file system 118 may convert or translate the commands into different commands configured in accordance with a protocol for an object-based storage system (such as the LTS system 130). Thus, a file path may exist for each object in the workspace 110 even if the objects are stored in the LTS system 130 according to an object ID rather than a file path. An example file system 118 that performs this functionality is described in U.S. patent application Ser. No. 17/867,169, the entire disclosure of which is hereby incorporated by reference.

As illustrated, the workspace 110 includes one or more applications 112. The applications 112 may comprise instructions allowing the workspace 110 to interface with the client devices 140. The applications 112 may include client-server and/or web-based applications via which a user interfaces with objects via a client device 140. The applications 112 may receive requests from the client device 140 to access one or more objects. The applications 112 may transmit a copy or a view of the one or more objects to the client device 140 in response to the request. The applications 112 may communicate with the client device via HTTPS or any other suitable protocol.

The cache manager module 114 may comprise instructions for interfacing with the cache 120. The cache manager module 114 may create, modify, retrieve, synchronize, and/or delete one or more objects stored in the object storage 122. The cache manager module 114 may generate and/or modify one or more metadata fields in the metadata storage 124. The cache manager module 114 may determine whether a requested object exists in the object storage 122. If a requested object is not in the object storage 122, the cache manager module 114 may cause the LTS I/O module 116 to fetch the object from the LTS system 130. In some embodiments, the cache manager module 114 may determine whether an object in the object storage 122 exceeds a exceeds a cache freshness interval. If so, the cache manager module 114 may then flag the object for synchronization with the LTS system 130 and/or synchronize the object with the LTS system 130. In some embodiments, the cache manager 114 may instantiate a crawler application that crawls through the cache 120 to evaluate the freshness of objects in the cache 120. Additionally or alternatively, the cache manager 114 may perform the freshness evaluation upon detecting a request to interact with the object.

The LTS I/O module 116 may comprise instructions allowing the workspace 110 to interface with the LTS system 130. The LTS I/O module 116 may retrieve one or more objects and/or folders from the LTS system 130. The LTS I/O module 116 may transmit one or more objects, folders, and/or modifications to objects or folders to the LTS system 130. The LTS I/O module 116 may communicate with may interface with the LTS system 130 via HTTPS, SAMBA, Server Message Block (SMB), Common Internet File System (CIFS), or any other suitable protocol.

The LTS system 130 may comprise an individual server, a group of multiple servers, cloud-based system or another suitable type of computing device or system. The LTS system 130 may be located within a server provider's premises or hosted by a third-party provider. The LTS system 130 may be an object-based storage system in which objects are stored based on an object ID instead of a file path.

Generally speaking, the workspace 110 may facilitate the processing of objects. For instance, one or more folders comprising one or more objects may be first retrieved from the LTS system 130 to the workspace 110. Subsequently, objects may be selectively accessed by a client device 140 via the applications 112 for processing (e.g., to highlight, redact, analyze, select a set of objects for batch review, etc.).

The client device 140 may comprise any suitable computing device operated by a user affiliated with a customer. For example, the client device 140 may include one or more servers, personal computers, smartphones, tablets, or any other suitable computing device. The client device 140 may interface with the application 1124 over the via a web browser, a dedicated client application, or any other suitable application using HTTPS or any other suitable protocol. The client device 140 may permit a user to create, review, comment, annotate, and/or modify one or more objects via the application 112.

III. Example Sequences of Object Requests, Retrieval, and Caching

Figure 2:
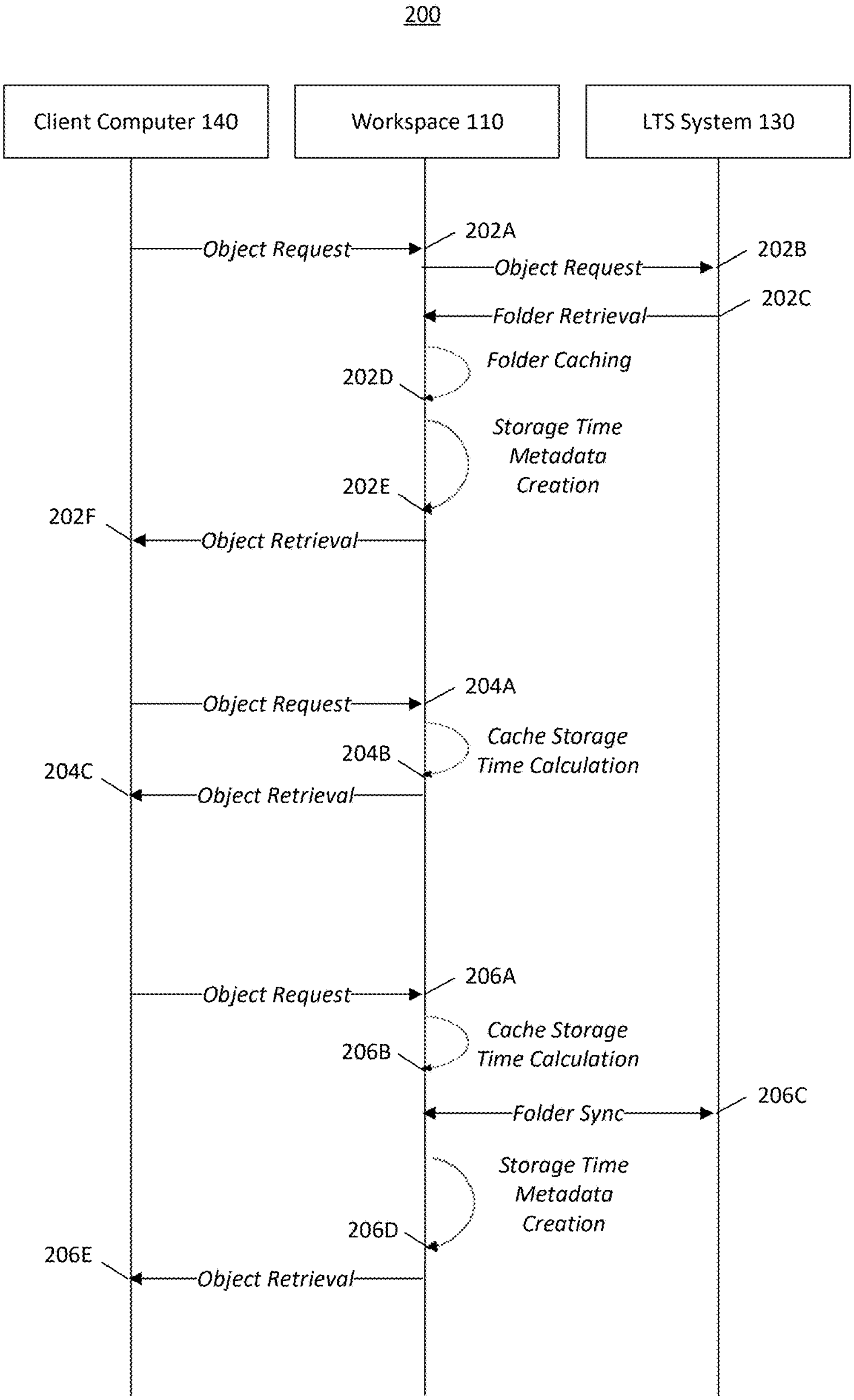
FIG. 2 illustrates a sequence diagram depicting object requests, retrieval, and caching, according to an embodiment.

FIG. 2 depicts an exemplary sequence diagram 200 associated with processing object requests, retrieval, and caching, including a depth-based determination of cache authoritativeness. The sequence diagram 200 includes a timeline of events affecting the client device 140, workspace 110, and LTS system 130. Not all steps illustrated in the sequence diagram 200 are mandatory, and the steps may be performed in an order different from what is depicted.

Steps 202A-202F illustrate a first request for an object and retrieval and caching of a folder comprising the object. At step 202A, an application 112 running in the workspace 110 transmits a request for an object, for example, in response to detecting a user interaction via the client device 140. In the illustrated scenario, the cache manager 114 determines that the that the requested object is not stored in the cache 120. Thus, at step 202B, the LTS I/O module 116 requests the object from the LTS system 130. At step 202C, the LTS system 130 returns the requested object to the LTS I/O module 116. At step 202D, the cache manager 114 stores the requested object into the cache 120. At step 202E, the cache manager 114 also creates a storage time entry in the metadata 124 corresponding to the time at which the folder was saved into the cache 120. It should be appreciated that the object also includes metadata indicating an object ID such that the cache manager 114 (or other application) is able to determine a location in the hierarchical folder structure maintained at the file system 118. At step 202F, the application 112 supplies the object to the client device 140.

Steps 204A-204C illustrate a second request and retrieval of the object while the folder in the cache 120 is still authoritative. At step 204A, the application 112 running in the workspace 110 transmits a request for an object, for example, in response to detecting a user interaction via the client device 140. In the illustrated scenario, the cache manager 114 determines that the object is stored in the cache 120. Thus, at step 204B, the cache manager 114 performs a cache storage time calculation. The cache manager 114 determines the depth of the object within the hierarchical folder structure of the file system 118 using an object ID associated with the object. Based upon the object depth, the cache manager 114 determines the corresponding cache freshness interval. The cache freshness interval represents a duration of time that an object in cache may remain authoritative. In the illustrated scenario, the cache manager 114 determines that the cache storage time is less than the cache freshness interval, thus the cached object is authoritative. Thus, the application provides the object to the client device 140 at step 204C.

Steps 206A-206E illustrate a third request and retrieval of the object when the folder in cache is no longer authoritative. At step 206A, the application 112 running in the workspace 110 transmits a request for an object, for example, in response to detecting a user interaction via the client device 140. In the illustrated scenario, the cache manager 114 determines that the object is stored in the cache 120. Thus, at step 206B, the cache manager 114 performs a cache storage time calculation. The cache manager 114 again determines the depth of the object and the corresponding cache freshness interval. In the illustrated scenario, the cache manager 114 determines that the cache storage time is greater than the cache freshness interval. As such, the cached object is no longer authoritative. At step 206C, the LTS I/O module 116 synchronizes and/or rehydrates the cached object with a version of the object stored at the LTS system 130. Synchronization may include the LTS I/O module 116 retrieving the latest version of the object as it is stored at the LTS system 130. At step 206D, the cache manager 114 creates and/or updates the storage time entry in the metadata 124. And at step 206E, the application 112 provides the object to the client device 140.

It should be appreciated that steps 206A-206E reflect a system where the cache manager 114 determines object authoritativeness in response to detecting a request to interact with an object. In other scenarios, a crawler application may perform the authoritativeness check on the object as the crawler crawls through the objects in the cache. In this scenario, if the crawler determines that the object is not authoritative, to avoid unnecessary requests to the LTS system 130 for objects that are not associated with requests, the crawler may set a flag to indicate that the object is non-authoritative without causing the LTS I/O module 116 to fetch a current version of the object from the LTS system 130. In these systems, when the cache manager 114 detects a request for a cached object, the cache manager 114 identify the value of the authoritativeness flag instead of performing a calculation to determine whether the object is authoritative.

IV. Example Folder Hierarchy in a Cache

Figure 3:
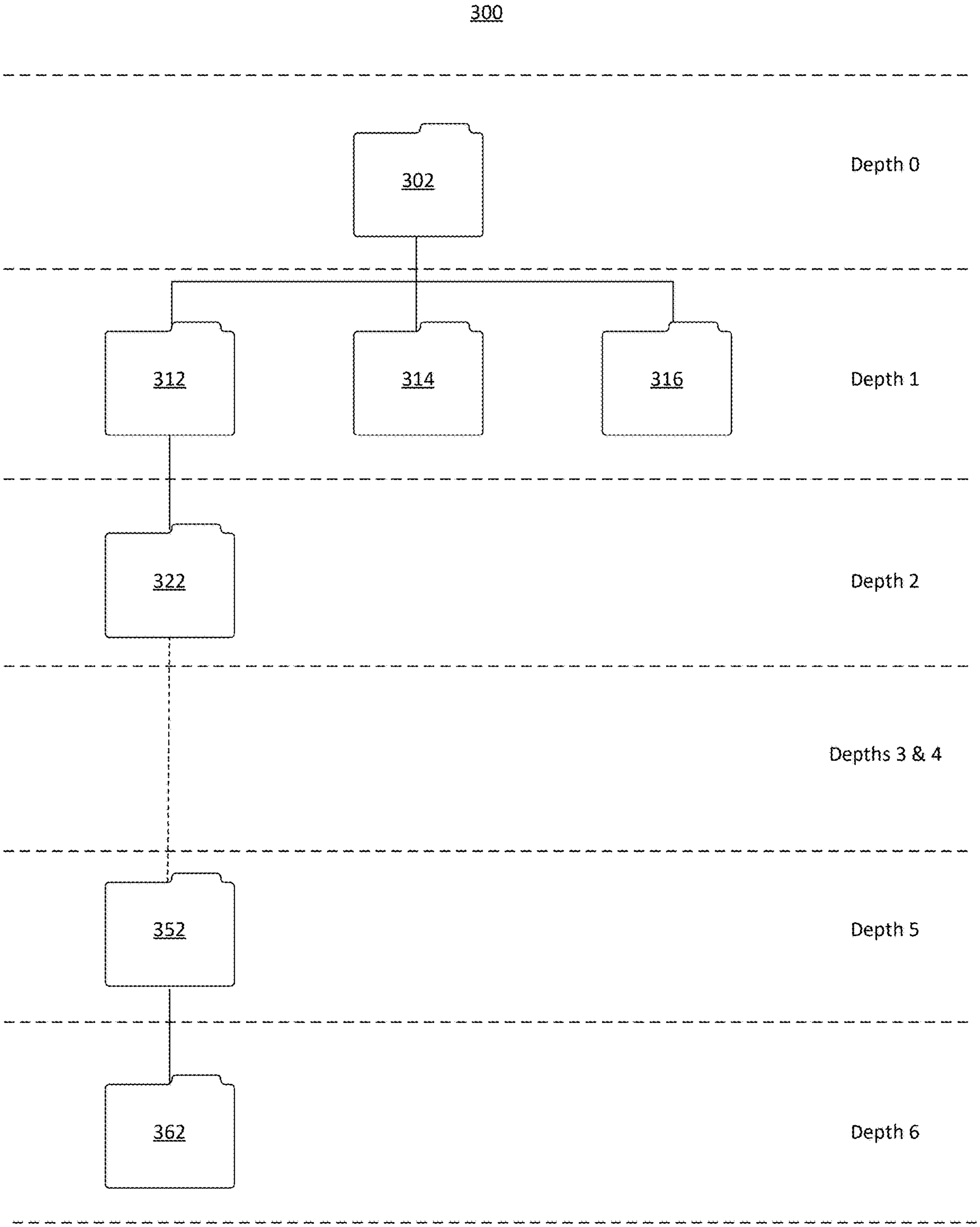
FIG. 3 illustrates an exemplary hierarchy of folders in a cache, according to an embodiment.

FIG. 3 depicts an exemplary folder hierarchy 300 associated with processing object requests, retrieval, and caching, including a depth-based determination of cache authoritativeness. The folder hierarchy 300 may be maintained by the file system 118. The folder hierarchy 300 may be maintained as a hierarchical directory in the file system 118. The folder hierarchy 300 may comprise a subset of the hierarchy of folders corresponding to objects maintained at the LTS system 130.

The folder hierarchy 300 may comprise a plurality of folders, such as folder 302, 312, 314, 316, 322, 352, 362. The folders 302, 312, 314, 316, 322, 352, 362 may have one or more objects located therein within the folder hierarchy 300. It should be appreciated that because the LTS system 130 may be an object-based storage system, the objects may not actually be stored in accordance with the structure indicated by the folder hierarchy 300. The folder hierarchy 300 may include a plurality of depths, such as depths 0-6. Folder 302, i.e., the root folder, may be located at depth 0, folders 312, 314, and 316 may be located at depth 1, folder 322 may be located at depth 2, a plurality of folders (not illustrated) may be located at depths 3 and 4, folder 352 may be located at depth 5, and folder 362 may be located at depth 6.

Each of the depths may have an associated cache freshness interval. As the depth increases, the cache freshness interval may decrease until a maximum depth limit is reached when the cache freshness interval remains constant for greater depths. For example, the cache freshness interval for depth 0 may be 72 hours, the cache freshness interval for depth 1 may be 36 hours, the cache freshness interval for depth 2 may be 24 hours, the cache freshness interval for depth 3 may be 18 hours, the cache freshness interval for depth 4 may be 12 hours, and the cache freshness interval for depth 5, i.e., the maximum depth limit, and greater may be 8 hours. In some aspects, an administrator may configure the cache freshness intervals for one or more depths or for one or more folders.

Each object in the folders may have its own storage time, corresponding to the time the object was cached or last synchronized. For example, objects in the folders 312, 314, and 316 are all at depth 1 and may have the same cache freshness interval but may have different storage times. Thus, objects in the folders 312 and 314 may be authoritative, while objects in the folder 316 may not be authoritative at a given time.

V. Example Flow Diagram

Figure 4:
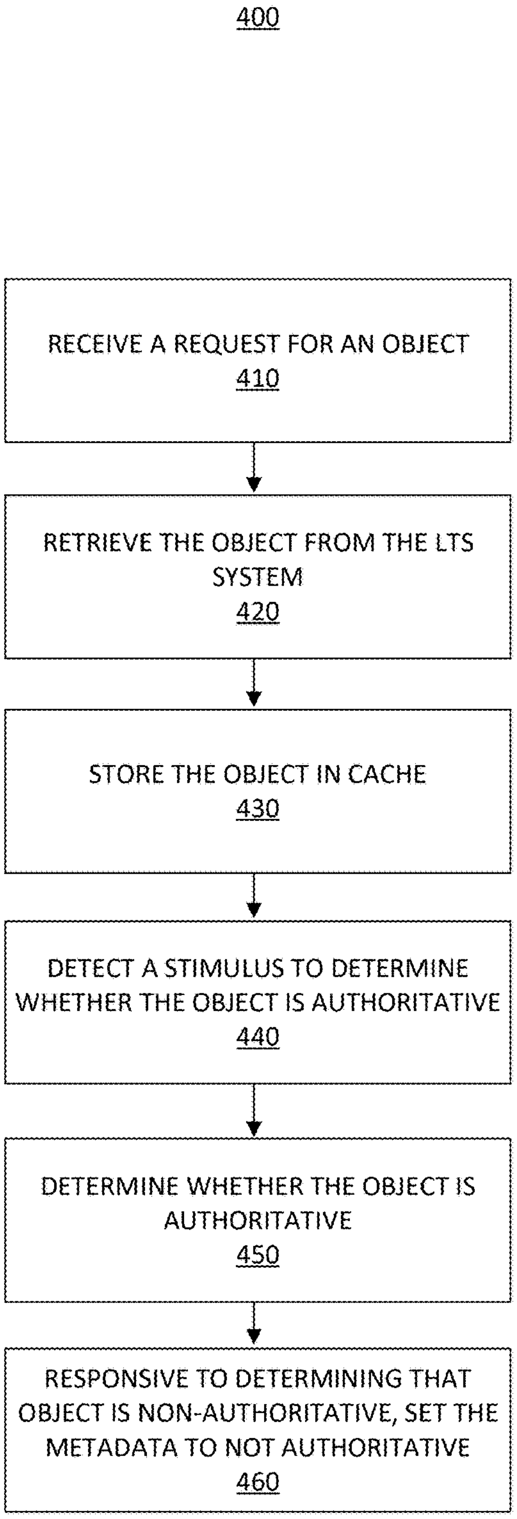
FIG. 4 illustrates an exemplary flow diagram for a method of determining authoritativeness of an object in a cache, according to an embodiment.

FIG. 4 depicts a flow diagram of an example computer-implemented method 400 for determining authoritativeness of a folder in a cache. The method 400 may operate as a stand-alone method, and/or may operate in conjunction with embodiments of at least a portion of the environment 100 and of any one or more components and/or devices related thereto, and/or with other systems, processors, databases and/or devices. For example, the workspace 110, including one or more of the application 112, the cache manager module 114, the LTS I/O module 116, and the file system 118 may execute at least a portion of the method 400. In some embodiments, the workspace 110 may execute at least a portion of the method 400 in conjunction with one or more other components of the environment 100, such as the client device 140 and LTS system 130. Further, the method 400 may include additional or alternate steps other than those described with respect to FIG. 4 in embodiments.

The method 400 may include the one or more processors receiving a request for an object (block 410). The request may be initiated by a user of a customer operating the client device 140. The object may be maintained at a LTS system, such as LTS system 130. The object may be associated with a hierarchical directory.

At block 420, the one or more processors retrieve the object from the LTS system.

At block 430, the one or more processors store the object in a cache. The one or more processors may store the object in the object storage 122 within the cache 120. The one or more processors may store a storage time in the metadata 124. The storage time may correspond to the time at which the folder was stored the folder in the cache 120. The one or more processors may associate the object with metadata 124 indicating whether the object is authoritative.

At block 440, the one or more processors detect a stimulus to determine whether the object is authoritative. In one aspect, detecting the stimulus may include receiving a request to interact with the object. In one aspect, detecting the stimulus may include executing a crawler application configured to evaluate authoritativeness for objects in the cache and detecting that the crawler application is evaluating the object.

At block 450, responsive to detecting the stimulus, the one or more processors determine whether the object is authoritative. The one or more processors may compare the cache storage time to a cache freshness interval. In one aspect, the cache freshness interval may be derived based upon the depth of the object in the hierarchical directory.

In some aspects, an object having a first depth in the hierarchical directory may have a longer cache freshness interval than an object having a second depth, where the first depth is less than the second depth. In some aspects, a plurality of objects having the same depth may have the same cache freshness interval. In some aspects, one or more objects at a third depth greater than or equal to a maximum depth limit may have the same cache freshness interval as one or more objects at a fourth depth, where the third depth is less than fourth depth. In some aspects, the one or more processors may receive a specified cache freshness interval from an administrator or other user.

At block 460, the one or more processors, responsive to determining that the object in cache is not authoritative, set the metadata to indicate that the object is not authoritative. In one aspect, in response to setting the metadata to indicate that the object is not authoritative, the one or more processors may retrieve the object from the LTS system.

It should be understood that not all blocks of the method 400 are required to be performed. Moreover, the method 400 is not mutually exclusive (i.e., block(s) from method 400 may be performed in any particular implementation).

VI. Additional Considerations

The following additional considerations apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for practicing the techniques disclosed herein through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112 (f) unless traditional means-plus-function language is expressly recited, such as "means for" or "step for" language being explicitly recited in the claim(s).

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A computer-implemented method for determining authoritativeness of an object in a cache, comprising:

receiving, with one or more processors, a request for an object maintained at long-term storage (LTS) system and associated with a hierarchical directory in a file system;

retrieving, with the one or more processors, the object from the LTS system;

storing, with the one or more processors, the object in the cache such that the object is associated with metadata indicating (i) a storage time at which the storage occurred and (ii) whether the object is authoritative;

detecting, with the one or more processors, a stimulus to determine whether the object is authoritative;

responsive to detecting the stimulus, determining, with the one or more processors, whether the object is authoritative by comparing the cache storage time to a cache freshness interval indicative of a duration the object is considered authoritative, wherein; the cache freshness interval is derived based upon a depth of the object in the hierarchical directory, objects at a greater depth from a depth level member in the hierarchical directory are associated with a shorter cache freshness interval than objects at a lesser depth from the depth level member in the hierarchical directory, the object is authoritative when the cache storage time is less than the cache freshness interval, and the object is non-authoritative when the cache storage time is greater than the cache freshness interval; and responsive to determining that the object in the cache is non-authoritative, setting, with the one or more processors, the metadata indicating whether the object is authoritative to indicate that the object is not authoritative.

2. The computer-implemented method of claim 1, wherein one or more objects at a first depth in the hierarchical directory have a longer cache freshness interval than one or more objects at a second depth, where the first depth is less than the second depth.

3. The computer-implemented method of claim 2, wherein the one or more objects at the first depth have the same cache freshness interval.

4. The computer-implemented method of claim 1, wherein one or more objects in the hierarchical directory at a third depth greater than or equal to a maximum depth limit have the same cache freshness interval as one or more objects in the hierarchical directory at a fourth depth, where the third depth is less than fourth depth.

5. The computer-implemented method of claim 1, further comprising:

receiving, with the one or more processors, a user input defining the cache freshness interval.

6. The computer-implemented method of claim 1, wherein detecting the stimulus to determine whether the object is authoritative comprises:

detecting, with the one or more processors, a request to interact with the object.

7. The computer-implemented method of claim 6, further comprising:

responsive to setting the metadata indicating whether the object is authoritative to indicate that the object is not authoritative, retrieving, with the one or more processors, a current version of the object from the LTS system.

8. The computer-implemented method of claim 1, wherein detecting the stimulus to determine whether the object is authoritative comprises:

executing, with the one or more processors, a crawler application configured to evaluate authoritativeness for objects in the cache; and detecting, with the one or more processors, that the crawler application is evaluating the object.

9. A system for determining authoritativeness of an object in a cache, the system comprising:

one or more processors; and one or more non-transitory memories storing instructions that, when executed by the one or more processors, cause the system to:

receive a request for an object maintained at long-term storage (LTS) system and associated with a hierarchical directory in a file system;

retrieve the object from the LTS system;

store the object in the cache such that the object is associated with metadata indicating (i) a storage time at which the storage occurred and (ii) whether the object is authoritative;

detect a stimulus to determine whether the object is authoritative;

responsive to detecting the stimulus, determine whether the object is authoritative by comparing the cache storage time to a cache freshness interval indicative of a duration the object is considered authoritative, wherein: the cache freshness interval is derived based upon a depth of the object in the hierarchical directory, objects at a greater depth from a depth level member in the hierarchical directory are associated with a shorter cache freshness interval than objects at a lesser depth from the depth level member in the hierarchical directory;

the object is authoritative when the cache storage time is less than the cache freshness interval, and the object is non-authoritative when the cache storage time is greater than the cache freshness interval; and responsive to determining that the object in the cache is non-authoritative, set the metadata indicating whether the object is authoritative to indicate that the object is not authoritative.

10. The system of claim 9, wherein one or more objects at a first depth in the hierarchical directory have a longer cache freshness interval than one or more objects at a second depth, where the first depth is less than the second depth.

11. The system of claim 10, wherein the one or more objects at the first depth have the same cache freshness interval.

12. The system of claim 9, wherein one or more objects in the hierarchical directory at a third depth greater than or equal to a maximum depth limit have the same cache freshness interval as one or more objects in the hierarchical directory at a fourth depth, where the third depth is less than fourth depth.

13. The system of claim 9, wherein the instructions, when executed, cause the system to:

receive a user input defining the cache freshness interval.

14. The system of claim 9, wherein to detect the stimulus to determine whether the object is authoritative, the instructions, when executed, cause the system to:

detect a request to interact with the object.

15. The system of claim 14, wherein the instructions, when executed, cause the system to:

responsive to setting the metadata indicating whether the object is authoritative to indicate that the object is not authoritative, retrieve the object from the LTS system.

16. The system of claim 9, wherein to detect the stimulus to determine whether the object is authoritative, the instructions, when executed, cause the system to:

execute a crawler application configured to evaluate authoritativeness for objects in the cache; and detect that the crawler application is evaluating the object.

17. One or more non-transitory computer readable media storing processor-executable instructions that, when executed by one or more processors, cause the one or more processors to at least:

receive a request for an object maintained at long-term storage (LTS) system and associated with a hierarchical directory in a file system;

retrieve the object from the LTS system;

store the object in a cache such that the object is associated with metadata indicating (i) a storage time at which the storage occurred and (ii) whether the object is authoritative;

detect a stimulus to determine whether the object is authoritative;

responsive to detecting the stimulus, determine whether the object is authoritative by comparing the cache storage time to a cache freshness interval indicative of a duration the object is considered authoritative, wherein; the cache freshness interval is derived based upon a depth of the object in the hierarchical directory, objects at a greater depth from a depth level member in the hierarchical directory are associated with a shorter cache freshness interval than objects at a lesser depth from the depth level member in the hierarchical directory;

the object is authoritative when the cache storage time is less than the cache freshness interval, and the object is non-authoritative when the cache storage time is greater than the cache freshness interval; and responsive to determining that the object in the cache is non-authoritative, set the metadata indicating whether the object is authoritative to indicate that the object is not authoritative.

* * * * *